H. HOHOFF.
HEATING SYSTEM FOR SECTIONALIZED BROODERS AND INCUBATORS.
APPLICATION FILED FEB. 25, 1909. RENEWED APR. 12, 1913.
1,076,576.
Patented Oct. 21, 1913.
2 SHEETS—SHEET 1.
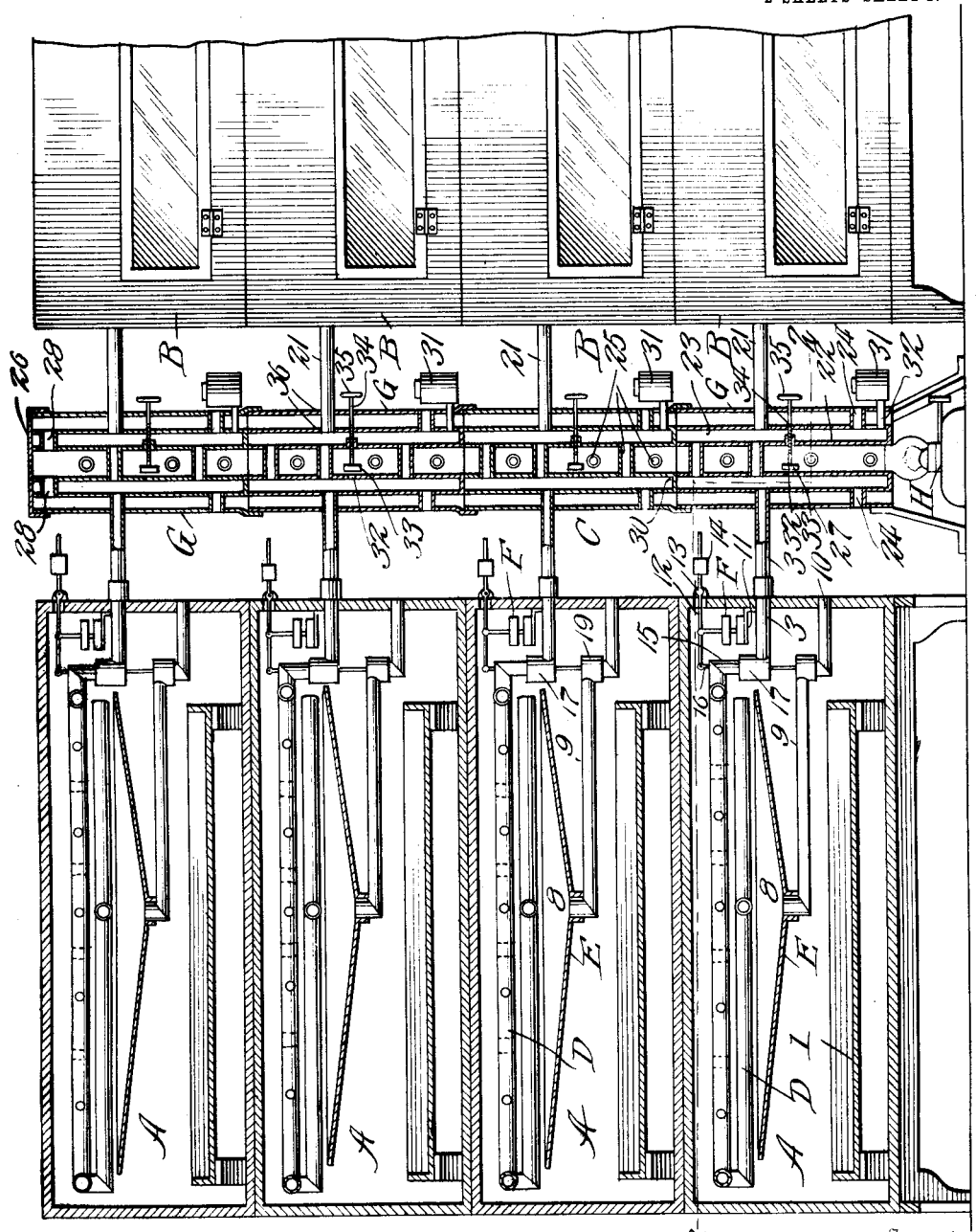

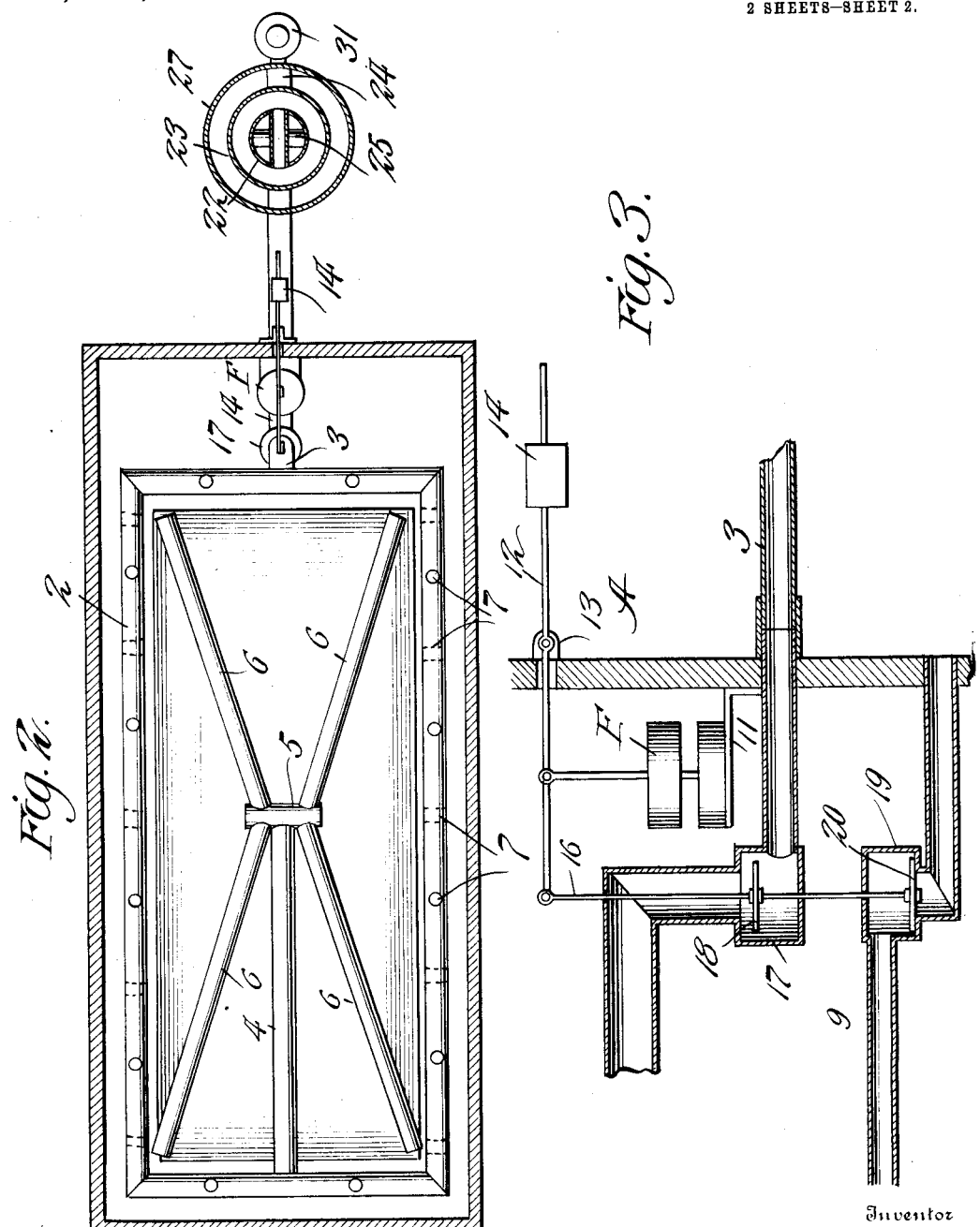

UNITED STATES PATENT OFFICE.

HENRY HOHOFF, OF DEER LODGE, MONTANA.

HEATING SYSTEM FOR SECTIONALIZED BROODERS AND INCUBATORS.

1,076,576. Specification of Letters Patent. Patented Oct. 21, 1913.

Application filed February 25, 1909, Serial No. 480,019. Renewed April 12, 1913. Serial No. 760,616.

*To all whom it may concern:*

Be it known that I, HENRY HOHOFF, a subject of the Emperor of Germany, residing at Deer Lodge, in the county of Powell and State of Montana, have invented new and useful Improvements in Heating Systems for Sectionalized Brooders and Incubators, of which the following is a specification.

This invention relates to an incubator or brooder of that type composed of sections adapted to be arranged one on top of another and provided with a common heating system, and it relates more particularly to a heating and ventilating appliance for such apparatus.

The invention has for one of its objects to improve and simplify the construction and operation of apparatus of the character referred to so as to be comparatively easy and inexpensive to manufacture and operate and thoroughly reliable and efficient in service.

A further object of the invention is the provision of a heating device for each incubator or brooder section, the devices of the various sections being so arranged that a common source of heat may be employed for all.

Another object is to provide an effective arrangement of hot air distributing pipes in each incubator section or unit, so that the temperature will be substantially uniform at every point, in combination with a cold fresh air supplying means which is adapted to be opened when the temperature operating on a thermostat cuts off a supply of hot air.

The invention has as a further object the provision of means for tempering the heated air with moisture so as to approximate the condition of natural incubation.

With these objects in view and others, as will appear as the description proceeds, the invention comprises the various novel features of construction and arrangement of parts which will be more fully described hereinafter and set forth with particularity in the claims appended hereto.

In the accompanying drawings, which illustrate one of the embodiments of the invention, Figure 1 is a vertical section of the sectionalized incubator and of the hot air heating device, with a portion of the sectionalized brooder in elevation. Fig. 2 is a horizontal section on line 2—2 of Fig. 1. Fig. 3 is an enlarged detail sectional view of the thermostatically actuated valves for controlling the cold and hot air supply pipe.

Similar reference characters are employed to designate corresponding parts throughout the several views.

Referring to the drawing, A designates the sections of the incubator and B the sections of the brooder, all of which are heated by a single heating device designated generally by C. The incubator sections A are of any approved size and design, and in each is an egg tray 1. Disposed within the sections A and located adjacent the top thereof are hot air distributing devices D, each device consisting of a rectangular tube 2 closely approximating the horizontal outline of the section, as shown in Fig. 2, and having an inlet pipe 3 connected to one end thereof. Extending inwardly from the opposite end of the rectangular air-conducting pipe 2 is a connecting pipe 4 that terminates midway between the ends of the rectangular tube, where it is provided with a head 5. From this head extend approximately diagonal air-distributing pipes 6 that have their open discharge ends directed to and terminating adjacent the corners of the section so that the corners will be effectively heated, as well as the central portion of the section, by the air circulating toward the center from the corners. The rectangular portion 2 of the hot air-conducting conduit is provided with short vertical and horizontal cross flues 7 through which the air in the incubator section can freely circulate and become heated by contact with the tubes thereof. Furthermore, the hot air conducted through the pipe radiates a portion of its heat to the surrounding air in the incubator section. With a hot air distributing device of the construction described the incubator section can be uniformly heated.

Disposed under the hot air distributing device D is a cold air distributing device E which consists of a rectangular funnel 8 discharging upwardly and having an inlet pipe 9 extending from the center of the funnel to one end of the incubator section, where it communicates at 10 with the atmosphere. The air is conducted from each incubator section in any suitable manner, and preferably from the bottom so that the air will be drawn down toward the eggs held in the tray 1, and I may use, if desired, the construction shown in my copending application, Serial No. 381,828, filed July 2, 1907, whereby the air is drawn out of an incubator section from a point adjacent the bottom thereof. In the present instance the invention does not relate to a special form of air outlet, and for this reason it is deemed unnecessary to illustrate the same.

The supplies of hot and cold air to each incubator section are controlled by a thermostat F of any approved construction which is mounted within the incubator section on a bracket 11, and the movable element of the thermostat is connected with a lever 12 fulcrumed at 13 and provided with a counterbalance weight 14 on the end projecting out through the section. The inner end of the lever terminates over the vertical portion 15 of the hot air inlet pipe 3 and connects with a valve stem 16 arranged in the said vertical portion 15. Included in the pipe 3 is a valve casing 17 that contains a valve 18, Fig. 3, mounted on the stem 16 so as to be moved to open or closed position by the thermostat. The stem 16 of the valve extends downwardly into a valve casing 19 included in the cold air supply pipe 9 that contains a valve 20 connected with the said stem. The valves are so arranged that when one is fully open the other will be fully closed, so that when a maximum amount of hot air is required the cold air will be totally cut off, and vice versa, when the temperature is so high that no more hot air is required. In this way a comparatively uniform temperature can be automatically maintained in each incubator section.

The brooder sections B are of any approved construction, and they may be provided with hot air distributing means of any desired design, the hot air being supplied in each section by an inlet pipe 21.

The hot air supplying apparatus C is preferably constructed of sections which correspond with the sections of the incubator and brooder, so that the heating apparatus can be built up with the incubator and brooder to any desired size and capacity. Each unit G of the heating apparatus C consists of a central flue 22 of any desired cross section and disposed vertically, and arranged concentric around the same is a fresh air flue 23, and communicating with this flue are inlet pipes 3 and 21 of the incubator and brooder sections, respectively, the fresh air being admitted to the flue 23 through short inlet tubes 24. The central heating flues of the sections G communicate to form a single passage through which the fire gases or heating medium passes. In the present instance the heat is furnished by a lamp H located to discharge into the central flue of the lowermost section, and the flues 23 become heated by the fire gases and thus warm the air passing through the flues 23 to the incubator and brooder sections.

In order to effectively abstract the heat units from the heating medium, the flues 22 are provided with short cross tubes 25 which open into the flues 23 so that air can freely circulate back and forth and thus become highly heated. The uppermost section G is provided with a cap 26 when it is desired to return the heating medium or fire gases downwardly around the outside of the flues 23, and for this purpose each flue 23 is surrounded by a flue 27, the latter flues of the various sections communicating, as shown, so as to permit the fire gases to flow downwardly the full length of the heating device and to discharge into the atmosphere at the bottom. The fire gases pass into the outer flue 27 through short connecting pipes 28 in the top section or unit of the heating apparatus. The air inlet tubes 24 extend across the path of the fire gases, traversing the outer flue, and the fresh air passing through such short tubes becomes initially heated. The bottom of each fresh air flue 23 is closed to form a pan 30 which is adapted to hold water so that the evaporation will temper the air supplied to the incubator and brooder from the heating system, and for supplying water to these pans automatic level maintaining fonts 31 of any approved character are provided on each section G, the water being conducted from each font through a horizontal tube 32 extending through apertures in the flues 23 and 27. The flues 22 may be provided with openings 32 for connecting the same with the flues 23, whereby air can be by-passed from one to the other as it may be found desirable, and these openings are controlled by valves 33 that are provided with stems 34 extending outwardly through the flues and equipped with hand wheels 35 for opening and closing the valves. When it is desired to employ the heating system in connection with incubators only, the apertures 36 in the flues 23 and 27 may be plugged after the pipes 21 are withdrawn, so that the heated fresh air will not escape to the atmosphere, or, if desired, the air inlet pipes 3 and 21 may be provided with valves for cutting the incubator or brooder sections into or out of service. Since the heating system is made up of sections it is possible to arrange the incubator and brooder sections one on top of another, instead of being separated, thereby economizing floor space, lamps, etc.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative and that such changes may be made when desired as are within the scope of the claims.

Having thus described the invention, what is claimed as new, is:—

1. In an apparatus of the class described, the combination of a structure to be heated, means therein for distributing heated air, and a heating device consisting of concentric inner, outer and intermediate flues, means for establishing communication between one end of the space between the outer and intermediate flues and the corresponding end of the inner flue, said space being open at the other end to the atmosphere, means for delivering a heating medium to the end of the inner flue corresponding to the open end of said space whereby the heating medium may pass through the inner flue and thence through the said space in the opposite direction from its passage through the inner flue, means for admitting air to the space between the inner and intermediate flues, means within the inner flue for admitting a portion of the heating medium to the air-heating space from the inner flue, and means for supplying heated air to the first-mentioned means from the space between the inner and intermediate flues.

2. In an apparatus of the class described, the combination of a structure to be heated, means therein for distributing heated air, and a heating device consisting of concentric inner, outer and intermediate flues, means for establishing communication between one end of the space between the outer and intermediate flues and the corresponding end of the inner flue, said space being open at the other end to the atmosphere, means for delivering a heating medium to the end of the inner flue corresponding to the open end of said space whereby the heating medium may pass through the inner flue and thence through the said space in the opposite direction from its passage through the inner flue, means for admitting air to the space between the inner and intermediate flues, a pipe leading through the outer and intermediate flues to supply water to the bottom of the air-heating space, means connected with the pipe for maintaining a substantially uniform quantity of water in the air heating space, and means for supplying heated air to the first-mentioned means from the space between the inner and intermediate flues.

3. The combination with an incubator, of a hot air distributing device therein, said device comprising a conduit in the incubator and extending close to the walls thereof, means connected with the conduit for supplying heated air thereto, a pipe connected with the conduit and leading to the center of the incubator, and a plurality of tubes connected with the inner end of the said pipe and extending therefrom toward the corners of the incubator, said tubes being open at their outer ends for delivering hot air to the said corners.

4. The combination with an incubator, of a hot air distributing device therein, said device comprising a conduit in the incubator and extending close to the walls thereof, means connected with the conduit for supplying heated air thereto, a pipe connected with the conduit and leading to the center of the incubator, a plurality of tubes connected with the inner end of the said pipe and extending therefrom toward the corners of the incubator, said tubes being open at their outer ends for delivering hot air to the said corners, and cross tubes extending transversely through the conduit and open at their ends whereby air can circulate through the cross tubes.

5. The combination with an incubator, of a hot air distributing device therein, said device comprising a conduit in the incubator and extending close to the walls thereof, means connected with the conduit for supplying heated air thereto, a pipe connected with the conduit and leading to the center of the incubator, a plurality of tubes connected with the inner end of the said pipe and extending therefrom toward the corners of the incubator, said tubes being open at their outer ends for delivering hot air to the said corners, a shallow funnel-shaped device disposed under the conduit and said tubes, and a pipe leading from the funnel and communicating with the atmosphere for supplying fresh air to the incubator.

6. The combination with an incubator, of a hot air distributing device therein, said device comprising a conduit in the incubator and extending close to the walls thereof, means connected with the conduit for supplying heated air thereto, a pipe connected with the conduit and leading to the center of the incubator, a plurality of tubes connected with the inner end of the said pipe and extending therefrom toward the corners of the incubator, said tubes being open at their outer ends for delivering hot air to the said corners, a shallow funnel-shaped device disposed under the conduit and said tubes, a pipe leading from the funnel and communicating with the atmosphere for supplying fresh air to the incubator, and differentially actuated valves in the conduit and last-mentioned pipe whereby the supply of heated
5 air to the conduit is increased while the supply of fresh air to the said device is decreased or vice versa.

In testimony whereof I affix my signature in presence of two witnesses.

HENRY HOHOFF.

Witnesses:
 HENRY MUNCH,
 JOHN KREIER.